Figures 1, 2:
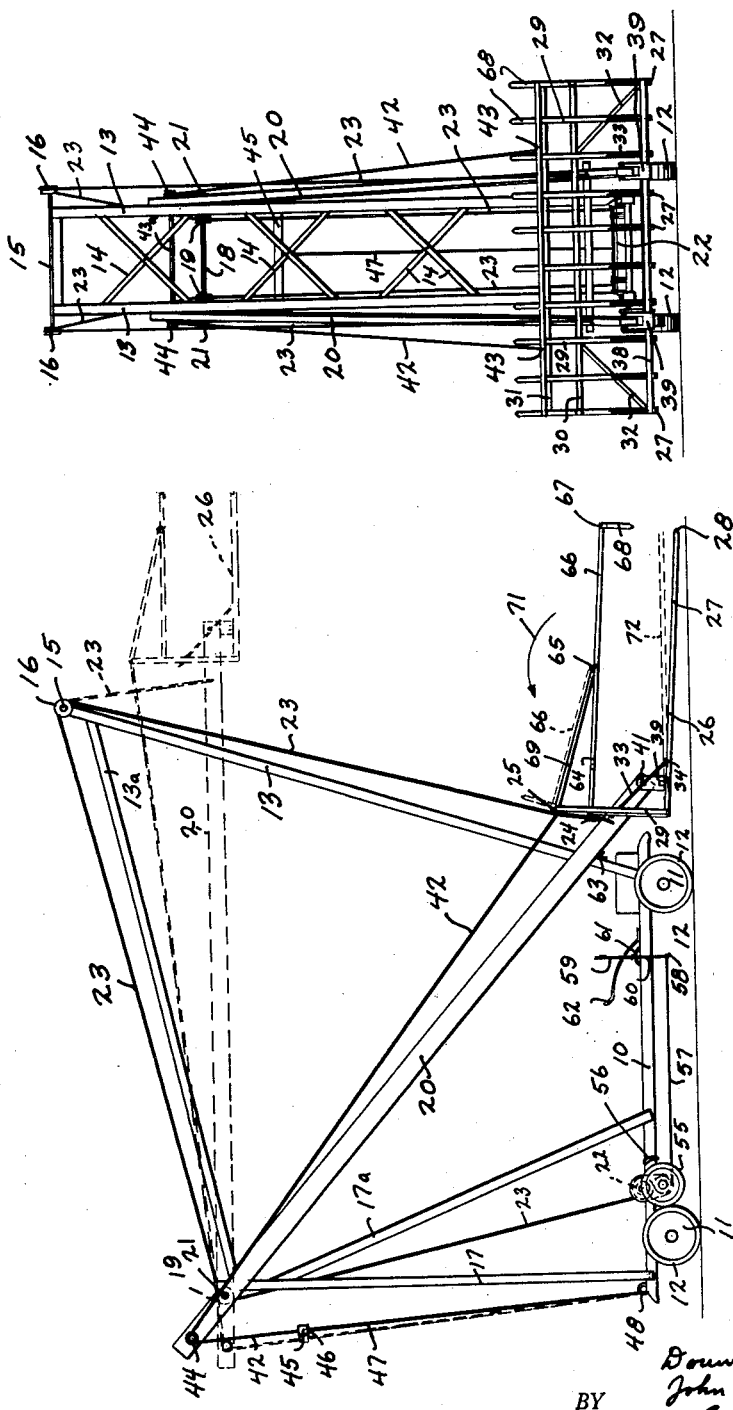

April 18, 1939. D. E. VAN DER BERG ET AL 2,154,790
COMBINATION MOTORIZED SWEEP RAKE AND HAY STACKER
Filed Dec. 24, 1937 2 Sheets-Sheet 1

INVENTORS
Douwe E. Vander Berg
John E. Vander Berg
BY
Sam J. Slotsky
ATTORNEY

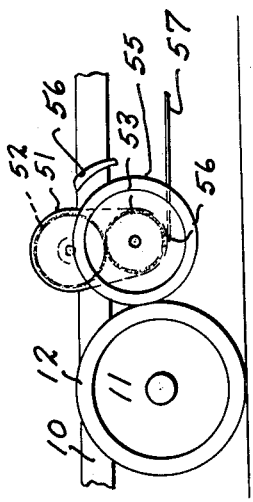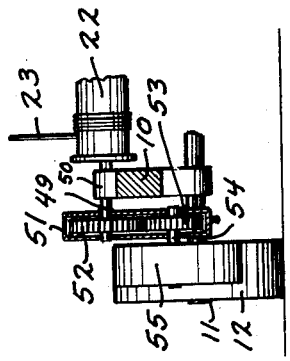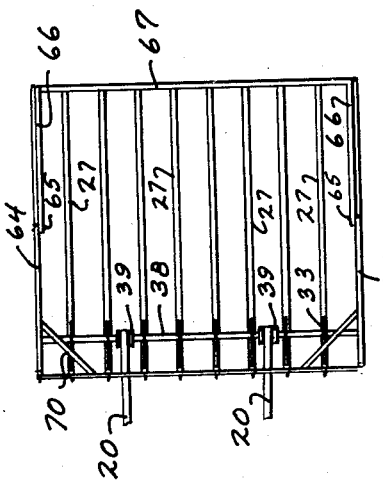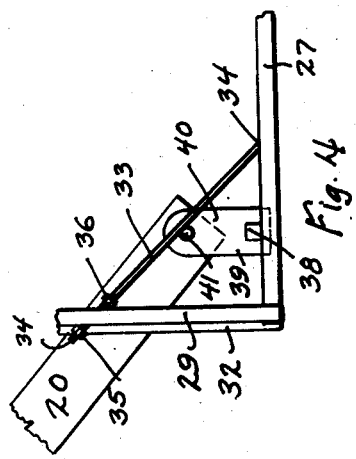

Patented Apr. 18, 1939

2,154,790

UNITED STATES PATENT OFFICE 2,154,790

COMBINATION MOTORIZED SWEEP RAKE AND HAY STACKER

Douwe E. Van der Berg and John E. Van der Berg, Sioux Center, Iowa

Application December 24, 1937, Serial No. 181,692

5 Claims. (Cl. 214—140)

Our invention relates to a unit for gathering and stacking hay.

An object of our invention is to provide an efficient unit of this character, which includes means for efficiently raking the hay onto the sweep rake.

A further object of our invention is to provide means for raising the gathered hay to the necessary height for forming haystacks, and further means cooperating therewith to maintain the sweep rake at a uniform horizontal position during such raising.

A further object of our invention is to provide means for easily tipping the rake at any height.

A further object of our invention is to provide means for forming stacks at the upper portions thereof without the necessity of tipping the rake, which would otherwise have a tendency of forming a non-uniform stack.

A further object of our invention is to provide automatic driving means cooperant with the members of the device so that the various functions are performed directly and automatically therefrom and in the proper relation.

A further object of our invention is to provide proper means for balancing the towers to eliminate tendencies of swaying, etc.

A further object of our invention is to provide adjusting means to the rake to compensate for uneven teeth and the like.

A further object of our invention is to provide means attached to the sweep rake so that the hay is retained during the raising operation by a suitable member.

A further object of our invention is to provide a structure having the foregoing characteristics in a simple design.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1 is a side elevation of the unit,

Figure 2 is a front view showing the rake raised to the horizontal position before lifting, and showing the covering member thrown back, Figure 3 is a plan view of the rake, Figure 4 is an enlarged detail of the adjusting members and also shows the connection of the lifting beams, Figure 5 is an enlarged detail of the power transmitting arrangement, and Figure 6 is a partially sectional view of Figure 5.

The principal difficulty in using present day hay stackers is the fact that the stacks are formed in a non-uniform manner since the hay must be raised to a comparatively high level and then dumped. The dumping action allows the hay to fall in a mass, which when striking the stack is apt to spread, thereby forming a more or less bulky mass not having uniformly and steeply slanting sides for shedding water, etc.

A further difficulty encountered is the fact that many of the operations must be performed independently, taking a great deal of unnecessary time and in many cases extra operations are performed which are not always necessary.

The principal objective aimed at in our invention is to eliminate such difficulties in a structure having elements so combined that the sweep rake combines with the stacking arrangement to perform its objectives efficiently and in a minimum of time.

We have used the character 10 to indicate generally the usual tractor body to which are journalled the wheels 11. The wheels 11 are preferably rubber tired with the tires 12 as shown. A forward tower having the side angle members 13 is attached at the lower ends to the frame 10 and the members 13 extend angularly upward as shown clearly in Figure 1.

Suitable cross braces are provided at 14 to brace the members 13. At the upper end of the members 13 is attached the shaft 15 upon which are rotatably journalled the pulleys 16. A rear tower is provided at the rear of the framework 10 having similar angle members 17, braced in the same manner, although the tower formed by the members 13 does not extend vertically as the tower 17. Further bracing members are provided at 13a and 17a.

Extending transversely and attached to the member 17 is the rear shaft 18 upon which is journalled the freely rotating pulleys 19, which pulleys are situated just inside of the members 17 (see Fig. 2).

A pair of lifting beams 20 are pivotally mounted upon the outer extensions 21 of the shaft 18 and these beams are closely adjacent to the exterior portions of the vertical members 17.

A winch 22 is suitably mounted upon the rear end of the truck and attached to the winch 22 are a pair of cables 23, which pass upwardly and over the pulleys 19, thence over the pulleys 16, thence downwardly where they are attached at 24 to the beams 20. The cables 23 are attached outwardly upon the beams 20 so that in the position shown in Fig. 1, the cables press against the rake at the point 25. The rake itself is indicated generally by the character 26 and includes several forwardly extending members 27, which are pointed substantially as shown at 28.

Attached at the rear end of the rake are the vertically extending members 29, which are substantially at right angles to the members 27, and which members are braced by means of the braces 30 and 31, as well as the angle braces 32. Means for adjusting vertical variations of the members 27 from the horizontal position, is provided by means of the rods 33, which are attached at 34 to each of the individual members 27. The rods 33 extend angularly upward and pass through the individual vertical members 29. The rods 33 are threaded at 34, with suitable lock nuts at 35 and 36 (see Fig. 4). The connection at 34 is made rigid and the threaded connection provides means then for slightly raising or lowering the members 27 with locking nuts providing locking means. The variation in heights is so small that only a small adjustment is made upon the threads 34 at the inner ends of the rake, thereby providing the maximum amount of adjustment necessary at the extreme ends of the members 27. This adjusting feature takes care of any distortions present in the extended members 27.

A square rod 38 (see Fig. 4), passes transversely of the members 27 and substantially close to the vertical members 29. The rod 38 is attached rigidly to each of the individual members 27. Attached to the square member 38 are the two members 39 which are spaced apart as shown, and which include vertically extending portions 40. Pins 41 pass through the members 40 and also pass through the ends of the beams 20. This construction, then, provides means for pivoting the rake 26 about the pins 41, and it will be noted that as the winch 22 is turned, that the cables 23 are drawn and gathered upon the winch, which in turn raises the rake 26 off of the ground. The cables 23 then perform the function of raising the hay upon the rake, only.

A further pair of cables 42 are attached at 43 to the upper end of the cross brace 31. A further shaft 43a passes through the upper extremity of the beams 20 and terminates in the rotatable pulleys 44. The cables 42 pass over the pulleys 44 and thence downwardly to the single-tree 45, and connected at the mid-point of the tree at 46 is the further single cable 47. The cable 47 passes downwardly and about another winch 48, which is suitably driven by electrical or other means and which is attached at approximately the rearmost portion of the framework 10. The function of the cables 42 in combination with the individual cable 47 is to provide means for maintaining an even horizontal positioning of the rake or to allow tipping of the same as desired at any point, whether the rake is positioned close to the ground or whether it is elevated, which function will be explained.

The shaft 49 of the winch 22 (see Fig. 6), passes through a pair of brackets 50, and on one side of the truck frame 10 is positioned the casing 51. The shaft 49 passes into the casing 51 and is attached rigidly to the gear 52. The gear 52 meshes with the further gear 53, which includes the shaft 54, which in turn is attached to the comparatively large rubber covered wheel 55. A small arcuate braking member 56 is provided, which is attached to one of the side members 10. The wheel 55 is directly in line with the rear wheel 11, as shown and pivotally attached at the bottom of the casing 51, at 56 is the horizontal rod 57 which is pivotally attached at 58 to the vertical hand lever 59, which in turn is pivoted at 60 to the frame work 10. The hand lever is controlled by means of the usual pawls and the like indicated substantially by the character 61 and is situated adjacent the seat 62 of the operator. A further stop member 63 is attached to the vertical members 13 to limit the downward drop of the beams 20. A further brace 64 is attached at the top portion of the outer members 29 and extends parallel to the member 26. There are two of such braces situated on either side of the rake and pivotally attached at 65 are the pair of further members 66, which terminate in the cross piece 67 to which are attached the downwardly extending teeth 68.

The teeth 68 are made substantially shorter than the distance between the members 64 and 26. Means for bracing the member 64 are provided by the angular braces 69, and the cross braces 70 (see Fig. 3). The space between the side members 64 and 66 is then left free with the teeth 68 however, being spaced apart the same distance as the members 27. Figure 1 illustrates the retaining member 66 in a normal position, as well as showing the member thrown back as indicated by the dotted structure and as shown in Fig. 2.

In operating the stacker and sweep rake, first the beams 20 are allowed to drop upon the top members 63 and the winch 48 is released, allowing the weight of the rake 26 to drop at the front portion thereof so that the forward teeth 28 are resting firmly on the ground surface. At this point, the cables 23 press against the top of the rake at 25, thereby applying a firm pressure which is transferred to the forward portions of the rake.

The action imparted by pivoting the beams 20 on the pins 41, has the pronounced tendency to apply pressure also against the forward ends of the members 27 since the pins 41 are located substantially above the level of the members 27, thus providing an efficient leverage during forward motion of the vehicle by virtue of the friction between the points 28 and the ground. This leverage can be moderated to suit the operator by controlling the winch 48. The hand lever 59, at this point, is pulled inwardly by the operator, causing the driving device to be locked so that a slight tension as desired by the operator is applied against the rake through the cables 23.

As the truck is driven forward, the rake passes beneath the hay on the field and prior to this operation, of course, the member 66 has been thrown in the direction of the arrow 71. As soon as the hay is upon the rake, the member 66 is thrown back to the position as shown approximately in the solid lines in Fig. 1, where it rests upon the hay and holds the same within the rake. The winch 22 is now released from the braking action and the cables 42 and the individual cable 47 are drawn upon the winch 48 until the rake occupies a horizontal position as shown at 72 in Figure 1. The rake is then ready for lifting. The lifting operation is performed by starting the winch 22 and the winch 22 is started by means of forcing the lever 59 ahead, which causes the engagement of the wheel 55 with the rear wheels 11, and the distance of travel of the wheels 11 can be easily gauged so that the height of elevation of the rake can be accomplished satisfactorily by means of manipulation of the lever 59. During forward travel of the truck, then, the engagement of the wheels 55 and 11 causes the cables 23 to be drawn about the winch 22, thereby raising the rake 26. When the stack is first being built or at the beginning of the stack building operation, after the rake 26 is suitably elevated, the winch 48 is released, causing the rake to tip since the weight of the hay will then allow it to pivot about the pins 41, and it will tip to any suitable angle allowed by the operator through the control of the winch 48, which also includes suitable braking devices not shown herein. In other words, after the rake has been raised to a suitable distance, the winch 48 is released performing the above function.

To maintain the beams in any raised position, the lever 59 is pulled towards the operator thereby bringing the wheel 55 into engagement with the arcuate member 56, thereby locking the winch and maintaining the rake in fixed position.

It will now be noted that as the rake is lifted to any height; that the construction involving the passing of the cable 42 over the pulleys 44, which pulleys are situated substantially above the pivoting point 21, provides the feature of maintaining the rake member 26 at a constant horizontal level. Assuming that the winch 48 is kept locked during the raising operation, there can be no variation in the functioning length of the cables 42 and the cable 47. Correspondingly, since the distance between the points 21 and the pulleys 44 is always constant, it will be seen that regardless of the height lifted, that the rake will be kept at a horizontal level on account of the compensation provided by such structure.

It will be seen from the foregoing then that we have provided means for elevating the hay, maintaining a constant level to the rake and with further means for allowing the rake to drop pivotally if such is desired, and where such is usually desired at the beginning of the stacking operation.

After the stack is built to a suitable height, it is not necessary to pivot the rake since the succeeding layers of hay are then carried over the stack and the rake is then allowed to drop slightly so that the members 27 rest upon the top of the stack. The members 20 are then locked in position as explained and the truck is reversed and during such reversal the friction of the hay upon the rake engages the further hay below the members 27 and will cause the hay layers to be held and the extended members 27 will then slide away from between the layers. In this manner, the important function of placing the hay exactly as desired on the top of the stock is accomplished without tipping the same and allowing the hay to drop in a mass which would spread and cause an inferior type of hay stack to be formed.

It is assumed, of course, that during the operation of removing the hay from the rake, that the member 66 is thrown rearwardly by an operator standing upon the stack or by other suitable means controlled elsewhere, if such is desired, thereby allowing release of the hay.

It will be observed that the positioning of the forward ends of the cables 23 upon the pulleys 16, which pulleys extend outwardly from the members 13, provides a further important feature which is namely, that of balancing the rake 26. Since the cables 23 support the comparatively large weight of the rake 26, the effect will be to more efficiently maintain the rake from side swaying motion, since the cables are operated similar to a plumb-bob, thereby tending to lower the center of gravity and also to balance the rake more properly. This feature is important in uneven fields to prevent lateral swinging of the rake due to the tower.

The feature of reeling the two cables upon the winch also provides for an even pull upon the rake and also permits the operator to load one side of the rake heavier, if such is necessary, and still maintain an even level.

It will be noted further that the adjusting braces 33 provide a further important feature namely, that of acting as a guide to force the hay to rise upwardly onto the inclined planes provided by the same, which allows easier removal of the hay, etc.

Other advantages will be inherent from the construction.

It will now be seen that we have provided a combination motorized sweep rake and hay stacker, which efficiently rakes the hay onto a sweep rake, which provides means for raising and gathering hay to any necessary height for forming haystacks, means for maintaining the sweep rake at a uniform horizontal level, means for tipping the rake to any desired height, further and important means for forming a haystack with uniform steep sides for purposes readily apparent, driving means accomplished automatically from the driving truck, which provides means for balancing of the tower, which includes means for compensating for uneven rake members, provides means for retaining hay during the raising operation, and which is comparatively simple in design.

Some changes may be made in the construction and arrangement of the parts of our invention without departing from the real spirit and purpose of our invention, and it is our intention to cover by our claims any modified forms of structure or use of mechanical equivalents, which may be reasonably included within their scope.

We claim as our invention:

1. A combination motorized sweep rake and hay stacker comprising a motorized vehicle chassis, a forward and rearward tower attached to the chassis, a sweep rake pivoted from the rear tower, means for elevating the sweep rake, including a pair of beams pivotally attached to the rake, means for lifting the beams, including a pair of cables attached to the beams, said towers including pulleys attached thereto over which said cables pass, means for maintaining the rake in a constant horizontal plane during any elevation of the rake, including a further pair of cables attached to the rake, said beams being extended rearwardly of their pivoting points, pulleys attached at said rear extensions, a winch mounted on said vehicle adapted to reel said cables, means for locking the winch, said cables passing over said pulleys and to the winch so that the cable lengths are constant which together with the constant length between the pivoting point of the beams and the pulleys and the angularity thereof maintains the rake at a uniform horizontal level, means for releasing said winch to cause the rake to pivot as desired and at any point of elevation thereof, said rake including a covering member including a pair of side braces, outwardly extending members pivotally attached to said braces, said outwardly extending members including a plurality of spaced vertical teeth.

2. A combination motorized sweep rake and hay stacker comprising a motorized vehicle chassis, a forward and rearward tower attached to the chassis, a sweep rake pivoted from the rear tower, means for elevating the sweep rake, including a pair of beams pivotally attached to the rake, means for lifting the beams, including a pair of cables attached to the beams, said towers including pulleys attached thereto over which said cables pass, a winch for reeling said cables mounted upon said vehicle, means for operating the winch directly from one of the vehicle wheels, including a gear attached to the winch shaft, a further gear meshing therewith, a friction wheel attached to said further gear, means for selectively causing engagement of said friction wheel with the vehicle wheel, including a case receiving said gears, a rod attached at the lower extremity of the case, a hand lever attached to said rod, said hand lever having a position for causing engagement of the friction wheels, a neutral position, and a locking or braking position.

3. A combination motorized sweep rake and hay stacker comprising a motorized vehicle chassis, a forward and rearward tower attached to the chassis, a sweep rake pivoted from the rear tower, means for elevating the sweep rake, including a pair of beams pivotally attached to the rake, means for lifting the beams, including a pair of cables attached to the beams, said towers including pulleys attached thereto over which said cables pass, a winch for reeling said cables mounted upon said vehicle, means for operating the winch directly from one of the vehicle wheels, including a gear attached to the winch shaft, a further gear meshing therewith, a friction wheel attached to said further gear, means for selectively causing engagement of said friction wheel with the vehicle wheel, including a case receiving said gears, a rod attached at the lower extremity of the case, a hand lever attached to said rod, said hand lever having a position for causing engagement of the friction wheels, a neutral position, and a locking or braking position, a braking member attached to the vehicle to lock the winch and maintain the rake at any position when said friction wheel is held against said braking member.

4. A combination motorized sweep rake and hay stacker comprising a motorized vehicle chassis, a forward and rearward tower attached to the chassis, a sweep rake pivoted from the rear tower, means for elevating the sweep rake, said sweep rake including a plurality of horizontally extending spaced members, vertical spaced members attached at the rears thereof, adjusting means for adjusting horizontal variations in said horizontally extending members attached between individual horizontal and vertical members.

5. A combination motorized sweep rake and hay stacker comprising a motorized vehicle chassis, a forward and rearward tower attached to the chassis, a sweep rake pivoted from the rear tower, means for elevating the sweep rake, said sweep rake including a plurality of horizontally extending spaced members, vertical spaced members attached at the rears thereof, adjusting means for adjusting horizontal variations in said horizontally extending members attached between individual horizontal and vertical members, and including angularly positioned brace rods attached therebetween, said rods being threaded at their upper ends, nuts engaging the threaded portions on either side of said vertical members to lock the rod for desired adjustment.

DOUWE E. VAN DER BERG.
JOHN E. VAN DER BERG.